United States Patent [19]

Pearse

[11] 3,945,391

[45] Mar. 23, 1976

[54] FLOAT CONTROLLED HYDRAULIC LEVELER

[75] Inventor: Robert G. Pearse, Red Bank, N.J.

[73] Assignee: Microtork, Inc., Red Bank, N.J.

[22] Filed: Nov. 18, 1974

[21] Appl. No.: 524,363

[52] U.S. Cl. .................. 137/45; 33/396; 137/41
[51] Int. Cl.² ........................................ F16K 17/36
[58] Field of Search ............ 137/45, 46, 41; 91/419; 33/396

[56] References Cited
UNITED STATES PATENTS

| | | | |
|---|---|---|---|
| 1,924,761 | 8/1933 | Turner | 33/396 |
| 2,684,254 | 7/1954 | Goss | 137/45 UX |
| 2,920,636 | 1/1960 | Gassner | 137/45 |
| 2,924,022 | 2/1960 | Callahan | 33/396 X |

*Primary Examiner*—Robert G. Nilson

[57] ABSTRACT

A hydraulic controller is disclosed which includes a housing assembly hermetically enclosing a hydraulic fluid, conduits for transporting hydraulic fluid into and out of the housing assembly, a valve control assembly for regulating the hydraulic fluid in selected conduits and a float unit for activating the valve control assembly.

3 Claims, 3 Drawing Figures

FLOAT CONTROLLED HYDRAULIC LEVELER

BACKGROUND OF THE INVENTION

This invention relates to apparatus for leveling boom-carried containers which support aerial workmen, such as telephone linemen and the like, and pertains in particular to arrangements in which leveling is achieved hydraulically.

Boom-carried containers are generally called baskets and must be stable in order to protect the occupants from being dumped out as the boom is manipulated. That is, as the boom moves, the basket must constantly remain in a level position. Typically, leveling is achieved through a hydraulic system.

Historically, hydraulic systems have been either costly or relatively insensitive and unstable. For example, where the hydraulic system is controlled by a pendulum, sudden stops and starts of the boom cause the pendulum to osciliate thereby introducing vascilations into the system. If the vascilations are not damped, the system will over-control and the basket will swing. Attempts to prevent such oscilations have heretofore generally proved to be costly, complicated or both.

Accordingly, the object of this invention is to achieve stable leveling control in a simple and reliable structure.

SUMMARY OF THE INVENTION

In accordance with a preferred embodiment of the invention, a sealed housing encapsulating a hydraulic fluid cooperates with a valve system and a control unit to achieve stability wherein the control unit selectively diverts the hydraulic fluid through the valve system in response to force exerted by the fluid and is immersed in the fluid so as to dampen spurious oscilations.

According to one feature of this invention, the valve system responds to movement of a rotating member, the control unit includes a float and a pendulum, the float and pendulum are disposed on opposite sides of the rotating member and both cooperate to maintain the magnitude of net force moment around the axis of the rotating member at or near zero thereby improving operating stability.

In accordance with another feature of this invention, the rotating member moves on a bearing surface and the float and pendulum exert oppositely opposed static forces of substantially the same magnitude on the bearing so as to increase sensitivity and reduce wear.

These and other objects and features of the invention will be more readily understood by referring to the following detailed specification and drawing which follow.

DETAILED DESCRIPTION OF THE INVENTION

Figure 1:
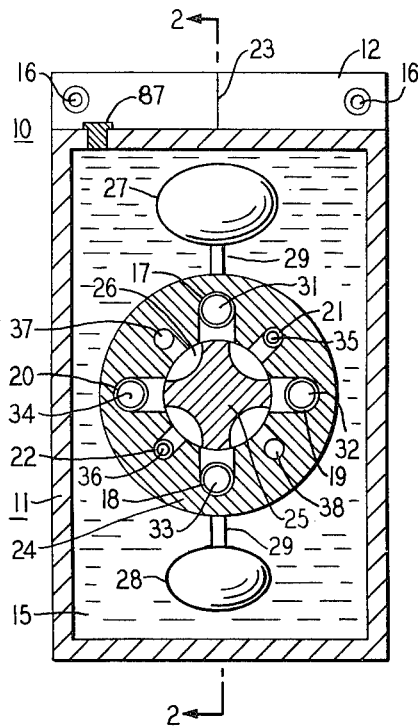
FIG. 1 is a front elevation view of a hydraulic controller made in accordance with this invention and taken in section along the line 1—1 in FIG. 2.
Figure 2:
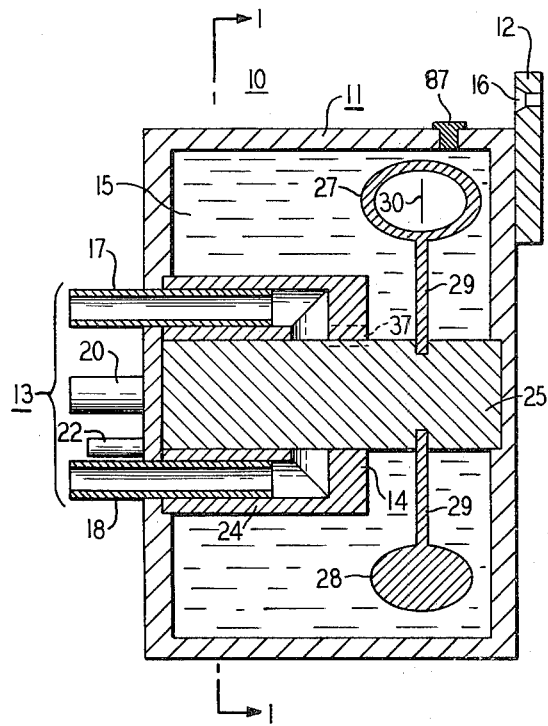
FIG. 2 is a side elevation view of the hydaulic controller illustrated in FIG. 1 as taken in section along line 2—2.
Figure 3:
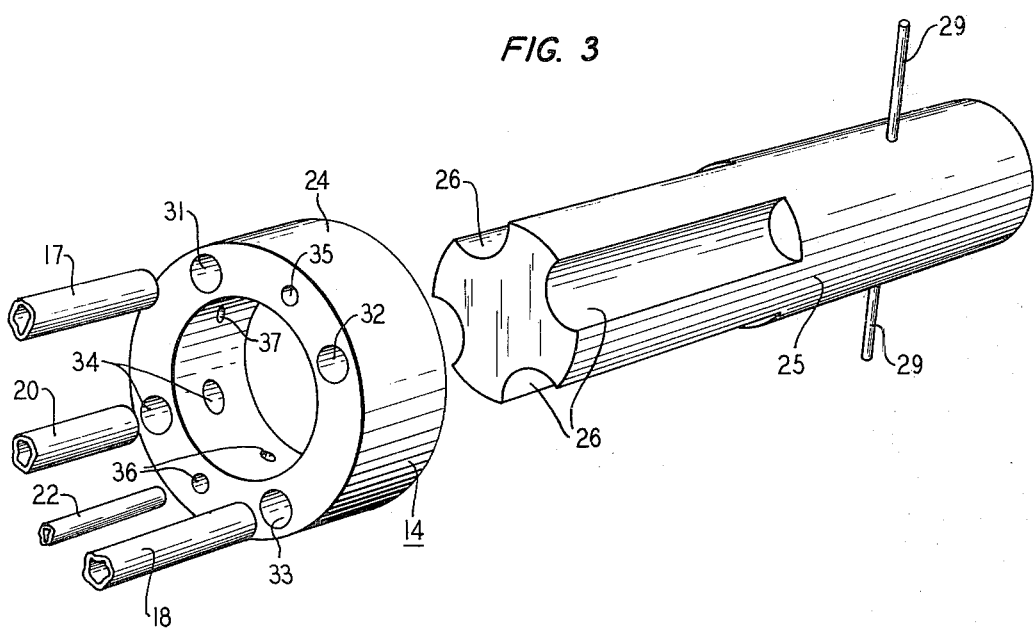
FIG. 3 is an enlarged view of a portion of the valve control and fluid conduit assemblies shown in FIG. 2 as taken in exploded perspective.

Referring to FIGS. 1 and 2, a hydraulic controller 10 is shown which comprises a housing assembly 11, a mounting bracket 12, a fluid conduit system 13 and a valve system 14. The housing assembly 11 is made of a pressure-resistant material, and its walls encapsulate a fluid 15.

The fluid conduit system 13 conducts the fluid 15 into the housing assembly 11 and includes four control conduits 17, 18, 19 and 20 and two pressure conduits 21 and 22. As best seen in FIG. 1, all of the conduits are diametrically opposed in sets and the two control conduits 17 and 18 are vertically disposed, while the other two control conduits 19 and 20 are horizontally disposed.

The mounting bracket 12 is rigidly attached to the housing assembly 11 and includes screw mounting holes 16 for attachment to a basket (not shown). As best seen in FIG. 1, the mounting bracket 12 is inscribed with a first reference line 23 oriented so as to radially intersect the center of the conduits 17 and 18.

The walls of the housing assembly 11 are advantageously recessed to accept the ends of the valve control assembly 14. As best seen in FIG. 2, the valve system 14 advantageously comprises a hollow cylinder 24 and a solid rod 25. The rod 25 fits within the central axis of the cylinder 24 in rotatable relationship and, when the two are joined, they perform a valving function. Thus, the fit between the two is tight so as to retard fluid leakage. For mounting, one end of the rod 25 is adapted for rotating attachment, and one of the cylinder 24 is adapted for rigid attachment, to the walls of the housing assembly 11; i.e., in the recesses therein.

The rod 25 includes four grooves 26, a float 27 and may advantageously include a solid pendulum weight 28 wherein the float and pendulum are attached to opposite sides thereof by rigid arms 29. Moreover, the float 27 may be hollow, made of a cellular plastic or the like and the arms 29 are positioned so that a second reference line 30 passing through the long axis of either will lie in the same plane as that which contains the first reference line 23. As shown in FIG. 1, the grooves 26 cooperate with the cylinder 24 to form spaces linking adjacent ports.

As best seen in FIG. 1, the cylinder 24 is apertured to have four control ports 31, 32, 33 and 34, two pressure ports 35 and 36 and two exhaust ports 37 and 38. The spaces formed by the grooves 26 and the ports all communicate at one end of the ports while, at the other end, the control and pressure ports communicate with the front face of the cylinder 24 and the exhaust ports communicate with the rear face thereof which is located within the housing assembly 11. In addition, the control ports 31, 32, 33 and 34 are adapted to accept the control conduits 17, 18, 19 and 20, respectively, while the pressure ports 35 and 36 are adapted to accept the pressure conduits 21 and 22 respectively.

As can be understood from FIG. 1, a fluid introduced through the pressure conduits 21 and 23 will pass through the pressure ports 35 and 36 and into associated spaces formed by the grooves 26. Thereafter, the fluid will be delivered into all of the control and exhaust ports. Fluid will reach kinetic balance when the housing assembly 11 is filled by the fluid from the exhaust ports and the external system (not shown) served by the control conduits is filled by fluid from the control ports. The housing assembly 11 advantageously includes an exhaust relief port 87. Thus, the balance reached is kinetic because fluid from the exhaust ports 35 and 36 is free to float into and out of the housing assembly 11. The exhaust drain port 87 is located at the top of the housing assembly 11, so as to insure that it always remains full.

The control ports cooperate with the pressurue ports and the exhaust ports to form two sets. Specifically, the first set comprises the pressure port 35, the control ports 31 and 32 and the exhaust ports 37 and 38. The second set comprises the pressure port 36, the control ports 33 and 34 and the exhaust ports 37 and 38.

Each set functions identically to the other so a description of one will suffice for the other. In the first set, the control ports 31 and 32 are connected to opposite sides of a motor control mechanism (not shown) through the control conduits 17 and 18, respectively. In the condition shown in FIG. 1, the control ports 31 and 32 will be equally pressurized and thus the motor control mechanism will be in its rest condition. If the pressure in either control port changes, however, the motor control mechanism will proportionally change its position. That movement is used to restore the hydraulic controller 10 after it has been displaced.

In use, the hydraulic controller 10 is attached to the basket so that the first reference line 23 is perpendicular to the earth. As best seen from FIG. 2, the float 27 is supported in the fluid 15, while the pendulum 28 is drawn earthward by the force of gravity. Consequently, the second reference line 30 will also be perpendicular to the earth and thus in registration with the first reference line 23.

Once the initial attachment to the basket is made, the hydraulic controller 10 will remain inoperative so long as the first reference line 23 remains perpendicular to the earth. As the basket swings, the first reference line 23 will move away from the perpendicular. The second reference line 30, however, will remain perpendicular to the earth.

As can best be seen from FIG. 1, misalignment between the first and second reference lines 23 and 30 causes the rod 25 to rotate. As a result, the flow pattern through the ports becomes unbalanced which, in turn, activates the motor control mechanism. The motor control mechanism then exerts a force on the basket in a direction to return the first reference line 23 to its perpendicular position with respect to the earth. Consequently, the fluid medium used to energize the motor control system serves a double function in that it provides the forces for maintaining a reference line in fixed position as well as for providing the forces for activating the basket regulating motor control.

In the embodiment shown, both a float and pendulum have been disclosed. The hydraulic controller 10, however, will operate with or without a pendulum. In addition, the walls of the housing assembly 11 can advantageously be adapted to cooperate with the float 27 and the pendulum 28 so that the separating space therebetween is relatively small. As a result, a damping action will occur as the space closes and fluid is squeezed out. Consequently, whether the float 27 is used alone or with the pendulum 28, fluid damping will minimize oscliations due to inertia.

When the float 27 and the pendulum 28 operate in concert, however, an additional advantage is achieved. Specifically, when the basket stops and starts, the float 27 and pendulum 28 act together and the inertia of one counters the inertia of the other thereby maintaining the net moment around the axis of the rod 25 at or near zero. Consequently, oscilations are almost completely removed. Moreover, where the float and pendulum have the same buoyancy; that is, the positive buoyancy of the float balances the negative buoyancy of the pendulum, the, static forces are equally opposed, thereby minimizing load on the bearing surfaces between the rod 25 and the cylinder 24. As a result, bearing friction is reduced and sensitivity is achieved.

In the embodiment disclosed, the rod 25 and the cylinder 24 cooperate through a set of grooves in the former and a set of ports in the latter. It will be recognized, however, that other valving arrangements may work equally as well.

In summary, a hydraulic controller has been disclosed which is simple in construction, effectively utilizes available materials for multiple purposes and improves sensitivity, stability and reliability. It will be recognized, however, that the embodiment disclosed is merely representative of the principles of the invention and many other embodiments falling within its scope will readily occur to those skilled in the art.

What I claim is:

1. In an apparatus for hydraulically correcting misalignment between two members adapted to rotate with respect to each other, the combination comprising:

a housing assembly sealed to encapsulate a fluid under pressure, said housing assembly including means for attachment to one of said members and having a first reference line adapted to rotate in concert with said one member when it moves;

fluid distribution means having first and second conduits for transmitting said fluid between said housing assembly and an actuator means adapted to rotate said one member in one direction in response to a change in fluid pressure in one conduits and in the other direction in response to a change in fluid pressure in the other conduit;

valve means for selectively changing the fluid pressure in said first and second conduits, said valve means including first and second members adapted to move relative to each other, said first member being rigidly attached to said housing assembly so as to be fixed with respect to said first reference line, said second member containing a second reference line disposed in a pre-determined position with respect to said first reference line and adapted to move with respect to said first reference line when said first and second members move with respect to each other, and said first and second members including port means for opening a fluid access passage to one of said conduits when said reference lines move with respect to each other in one direction and for opening a fluid access passage to the other of said fluid conduits when said reference lines move with respect to each other in the other direction; and control means cooperating with said valve means and having float means for maintaining said second reference line in predetermined orientation with respect to the earth and said first member is fixed with respect to said housing assembly, while said second member is free to move with respect to said first member and said float means is attached to said second member and said port means includes input and output apertures in said first member and grooves in said second member adapted to equally bridge said input and output apertures when said second reference line is disposed in said pre-determined position with respect to said first reference line and said input apertures include two pressure ports, said output apertures include four control ports and two exhaust ports, and each groove links a pressure port or exhaust port to two control ports.

2. The combination in accordance with claim 1 wherein said float means included a float attached to said second member by a rigid arm and said control means includes a pendulum attached to a rigid arm projecting from the side of said second member opposite to the side to which said float is attached; said pendulum having substantially the same moment of inertia as said float.

3. The combination in accordance with claim 2 wherein said pendulum and said float exert substantially the same static force on second member.

* * * * *